Patented May 22, 1945

2,376,854

UNITED STATES PATENT OFFICE 2,376,854

CEMENTS

Seymour G. Saunders, Bloomfield Hills, and Harry Morrison, Detroit, Mich.

No Drawing. Application November 18, 1942, Serial No. 466,062

17 Claims. (Cl. 154—43)

This invention relates to an improved adhesive and to the method of making the same and this application is a continuation-in-part of our copending application Serial No. 394,798, filed May 26, 1941.

More particularly, the invention pertains to an adhesive of the class which is adapted to permanently bond together parts comprising a large variety of materials such as ferrous and nonferrous metals, wood, fabric, fiber board, plastics, laminated plastics, glass and ceramics.

Another object of the invention is the provision of an adhesive of this kind which has a synthetic rubber-like base compound strengthened by a synthetic resin or combination of such resins.

A further object of the invention is the provision of a synthetic resin content in neoprene base adhesives which cause the latter, while in an unset state, to readily wet surfaces comprising metals and other materials which are highly resistant to wetting.

Another object of the invention is the provision in a neoprene base adhesive of this character of synthetic resins which, render the adhesive both moisture and heat resistant and which harden without excessively reducing the resilient qualities of the set adhesive.

A further object of the invention is the provision of an adhesive of this kind which requires the application of only relatively low pressures in order to form structural bonds between parts of composite constructions.

An additional object is to provide an adhesive which, in its set state, is sufficiently yieldable to accommodate thermal expansive and contractive relative movements between the parts joined thereby, as well as to withstand violent shock and impact.

The improved adhesive preferably includes a synthetic rubber-like base material comprising a neoprene compound having the following formula:

| | Parts by weight |
|---|---|
| Neoprene (polymerized chloroprene) | 500 |
| Calcined magnesia | 50 |
| Finely divided asbestos | 275 |
| Phenylbeta - naphthylamine | 10 |
| Wood rosin | 30 |
| Zinc oxide | 50 |
| Sulphur | 5 |

The above neoprene base is compounded in accordance with the practices and technique conventionally used in compounding of rubber. The neoprene stock is initially worked on rolls of the type used in compounding rubber and while the stock is on the rolls, the calcined magnesia and rosin are added in a mixed state, thereafter the age resisting antioxidant is introduced during continued mastication of the above ingredients on the rolls. The filler, preferably finely divided asbestos is added to the above materials while they are undergoing manipulation on the rolls and subsequently the zinc oxide and sulphur, in a mixed state, are likewise added during further operation of the rolls. The entire rolling operation is preferably conducted for from 20 to 25 minutes and the resulting neoprene base compound is then removed from the rolls and transferred to a suitable dough mixer such as a Baker-Perkins mixer where it is softened by heating it to about 175° F. and further masticated preparatory to the addition of the synthetic resin content of the adhesive. If it is desired to omit this application of heat, chemical softeners may be used, such as diorthotolylguanidine, hexamethylene ammonium hexamethylene-dithiocarbamate or xylyl mercaptan.

The calcined magnesia is employed to prevent scorching of the material on the rolls during the compounding operation. Any suitable inert inorganic material which is compatible with the compound may be used for this purpose. Finely divided asbestos serves as an inert filler and may be substituted for by carbon black, clays or other fillers commonly used in compounding rubber. Phenylbeta-naphthylamine acts as an age resisting antioxidant and is sold for this purpose under the trade name "Neozone D." While Neozone D has been found to be particularly advantageous in this compound, any of the age resisting antioxidants used in the rubber industry and of the primary aromatic-amine or secondary naphthylamine types may be used in its place. The zinc oxide accelerates polymerization during setting of the adhesive. Wood rosin acts as a fluxing agent to facilitate mixing of the constituents of the base material during the milling operation to which they are subjected and also serves to actuate the polymerization accelerating action of the zinc oxide. The addition of sulphur in the base compound increases the strength of the final set adhesive. Adhesives of acceptable strengths for many purposes may be obtained without the addition of sulphur which in some instances can be advantageously omitted because of its detrimental action on the surfaces of some materials.

While the neoprene base compound is preferable, other synthetic rubber-like materials may be used in place of neoprene. Synthetic rubber compounds, commercially known as "Hycar" and "Chemigum" may be substituted in the same proportion for the neoprene of the foregoing formula. Neoprene is a polymer of chloroprene which is a chlorinated butadiene, while "Hycar" and "Chemigum" are butadene acrylic nitrile type copolymers and are manufactured by the Hydrocarbon Chemical and Rubber Company and Goodyear Tire and Rubber Company, respectively. This base is compounded in the same manner as heretofore set forth in the description of neoprene base compound.

The neoprene of the foregoing formula may be substituted for by an equal amount of either "Hycar" or "Chemigum." The following is a typical formula for the "Chemigum" base compound:

| | Parts by weight |
|---|---|
| "Chemigum" | 500 |
| Calcined magnesia | 50 |
| "Santocure" | 4 |
| Finely divided asbestos | 275 |
| Phenylbeta-naphthylamine | 10 |
| Wood rosin | 30 |
| Zinc oxide | 25 |
| Sulphur | 8 |

This formula differs from the neoprene base compound mainly in that the zinc oxide content is reduced and "Santocure" is added as an organic accelerator for curing. "Santocure" is a condensation product of mercaptobenzothiazole and cyclohexylamine. The "Chemigum" base is compounded in the same manner as the neoprene base compound.

The foregoing synthetic rubber base compounds are herein, and in the claims, referred to as chloroprene polymer base compound and butadiene acrylic nitrile base compound respectively.

Various synthetic resins and combinations thereof may be used in combination with the foregoing synthetic rubber base compounds. When it is desired to impart to the finished adhesive certain of the characteristics of thermosetting synthetic resins, phenol-formaldehyde resins or urea formaldehyde resins may be employed. The effect upon the adhesive of the resultant characteristics of thermoplastic and thermosetting resins may be obtained by the addition to the synthetic rubber base compound of a mixture of hydrolyzed polyvinyl acetate and phenol-formaldehyde resins. Hydrolyzed polyvinyl acetate resin in solution in suitable solvents is available on the market under this nomenclature and has a complex chain of interlinked molecules. The structure of the hydrolyzed polymer may be pictured as a long chain, the alternate links of which are vinyl alcohol and vinyl acetate units:

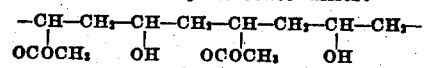

In general, the actual distribution of the alcohol and ester components in the chain depends on the chance hydrolysis of the ester group.

The synthetic resin content of the adhesive may comprise a mixture of urea formaldehyde resin and "Butacite," the latter being polyvinyl butyral. When a mixed synthetic resin content is employed, the proportions of the respective resins may be varied in order to derive the predominant characteristics of the respective resins desired. Particularly advantageous results have been obtained by using equal portions of the resins specified in the above mentioned mixtures.

The resin constituent of the adhesive is preferably incorporated with the synthetic rubber base compound while the latter is undergoing mastication in the mixer at a softening temperature, or in the absence of heat or in the presence of chemical softeners of the type previously specified. The resins may be added in concentrated form or in solution in solvents such as acetone, ketones, methylacetate, toluol or butyl alcohol, depending upon the nature of the resin. When the batch in the mixer has become substantially homogeneous after the addition of the resin, a sufficient solvent is added to reduce the adhesive to a desired consistency. In the case of the neoprene base compound, the solvent preferably comprises a major portion of high flash naphtha and a minor portion of ethyl alcohol. Various other volatile solvents and combinations thereof may be used for this purpose. A mixture of ethylene dichloride and chorobenzene is a preferred solvent for both the "Hycar" and "Chemigum" base compounds. An adhesive of suitable consistency for general application may be made from the proportions set forth in the following formulae:

| | Parts by weight |
|---|---|
| Neoprene base compound | 300 |
| Synthetic resin | 100 |
| Naphtha | 600 |
| Alcohol | 35 |
| "Hycar" base compound | 300 |
| Synthetic resin | 100 |
| Ethylene dichloride | 420 |
| Chlorobenzene | 180 |
| "Chemigum" base compound | 300 |
| Synthetic resin | 100 |
| Ethylene dichloride | 420 |
| Chlorobenzene | 180 |

A cement embodying a modification of our invention may be produced by mixing the foregoing adhesive which comprises the synthetic rubber base compound and polyvinyl acetate and phenol formaldehyde resins, with equal parts of a 25% solution of cyclized rubber, chlorinated rubber or rubber hydrochloride. The cyclized rubber may be dissolved in any suitable hydrocarbon, preferably high flash naphtha and then added to the solvent thinned phenol formaldehyde-polyvinyl acetate resin adhesive. The proportions of the resins and cyclized rubber may be varied throughout relatively wide limits to impart to the final adhesive the properties desired. The foregoing proportions produce an adhesive which is particularly adapted for bonding together the layers of laminated wood, sheets of wood and aluminum or zinc coated ferrous metal.

The polyvinyl acetate-phenol formaldehyde resin cement, while suitable for general application since it produces bonds of high tensile and shear strengths, is particularly adapted for bonding parts of ferrous metal together or to glass or synthetic resin products such as Bakelite. The resulting bond is highly resistant to moisture and heat and can be substantially completely set by curing at from 300° F. to 325° F. for a period of fifteen minutes.

The adhesive having a synthetic resin content only phenol formaldehyde resin has particularly high wetting qualities and can be used to advantage in forming bonds with surfaces which are difficult to wet, such as aluminum, brass, copper and zinc. This form of the adhesive can be set by curing at from 300° F. to 325° F. for a period of fifteen minutes. The same curing temperature and period may be used in setting the adhesive which comprises a urea formaldehyde resin and a synthetic rubber compound.

The form of the adhesive which has a resin content comprising urea formaldehyde resin and Butacite can be cured to a set state by heating at a temperature of substantially 200° F. for one hour. This form of the cement is particularly adapted for bonding together layers of glass in the production of "shatter-proof" glass and can be used to advantage in conjunction with cyclized rubber sheet bonds of the character set forth in our application, Serial No. 354,230.

The improved adhesive has been found to have bonding properties suitable for structural purpose, bonds between metal parts having an ultimate shear strength of from 3,000 to 4,000 pounds per square inch being attainable. This and other properties of the cement well qualify it for use in fabrication of parts for airplane construction, for example, where the elimination of rivet holes and the detrimental effect of spot welding is highly desirable. The unusual properties and strength of the bond obtained by the use of the improved adhesive can, it is believed, be attributed largely to the relative state of its synthetic rubber compound and synthetic resin content which is produced by the heretofore recited procedure by which it is compounded. By pre-compounding the curable synthetic rubber compound in the manner set forth in order to incorporate its synthetic rubber material and compounding agents including its inert strength giving filler and the introducing thereinto the synthetic resin content by a mixing operation and under the conditions specified, the synthetic resin is so physically mixed with the synthetic rubber compound as to produce in effect a mass of particles of curable synthetic rubber compound having substantially surrounding films or particles of synthetic resin.

The pre-compounding of the synthetic rubber compound, during which a relatively large amount of inert filler is introduced, renders it resistant to solution by and dissolving into the synthetic resin content. Chemical reaction and copolymerization between the synthetic rubber and synthetic resin does not occur at the relatively low softening temperature prevailing during mixing.

The synthetic resin films or particles are adapted, upon setting of the adhesive, as herein set forth, to tenaciously bond together the particles of synthetic rubber compound which are cured simultaneously with the resin during setting of the adhesive providing cohesion of a high order in a set film of adhesive. This synthetic resin content when cured also rigidifies the mixture and bonds tenaciously with the surfaces of the parts of an assembly to provide the adhesion required in structural bonds. Neither the cohesive nor adhesive strength of the synthetic resin films or particles are significantly decreased by continuity interrupting particles of the inert filler of the synthetic rubber compound for such fillers are retained mainly in the particles of synthetic rubber compound in which they were incorporated on rubber compounding rolls and from which they do not readily migrate to the synthetic resin content under the action of the operation during which synthetic rubber compound and synthetic resin are merely mixed together until the resulting mass appears homogeneous throughout.

The thus cohered together particles of synthetic rubber compound in a film of set adhesive, which are cured during the setting operation, retain sufficient yielding properties to promote distribution of the load applied on a bond throughout substantially the entire bonding area. This prevents failure of the bond by application of excessive loads successively upon adjacent increments thereof.

Although but several specific embodiments of our invention have been described, it is understood that various changes in the materials employed and in the sequence of steps as well as in the temperature and periods of heating, may be made without departing from the spirit of our invention.

It is claimed:

1. The method of making a cement composition, which comprises, forming a dispersion of synthetic rubber selected from the group consisting of chloroprene polymers and butadiene acrylic nitrile copolymers in a solution comprising essentially a thermo-setting synthetic resin in a volatile organic solvent therefor, said synthetic rubber being sufficiently insoluble in said resin solution to remain suspended therein as discrete particles in said solution.

2. The method as defined in claim 1 in which the synthetic rubber is a chloroprene polymer.

3. The method as defined in claim 1 in which the synthetic rubber is a butadiene acrylic nitrile copolymer.

4. The method as defined in claim 1 in which the synthetic resin comprises a mixture of thermo-plastic and thermo-setting resins.

5. The method as defined in claim 1 in which the particles of said synthetic rubber are curable and precompounded with fillers.

6. The method as defined in claim 1 in which the thermo-setting synthetic resin comprises a phenol formaldehyde resin.

7. The method as defined in claim 1 in which the thermo-setting synthetic resin comprises a urea formaldehyde resin.

8. A cement comprising a mixture of synthetic rubber selected from the group consisting of chloroprene polymers and butadiene acrylic nitrile copolymers, and an adhesive consisting essentially of a thermo-setting synthetic resin and a volatile organic solvent for said resin, said mixture being a dispersion of discrete particles of said synthetic rubber in a continuous phase of said resin in solution in said solvent.

9. The cement defined in claim 8 in which the resin forms the binding material in said cement and prevents substantial contact between said discrete particles of synthetic rubber and between the particles and the surfaces joined by said cement.

10. The cement as defined in claim 8 in which the synthetic resin comprises a mixture of thermo-setting and thermo-plastic synthetic resins.

11. The cement as defined in claim 8 in which the synthetic rubber is a chloroprene polymer.

12. The cement as defined in claim 8 in which the synthetic rubber is a butadiene acrylic nitrile copolymer.

13. The cement as defined in claim 8 in which the particles of synthetic rubber are curable and precompounded with a filler.

14. The cement as defined in claim 8 in which the thermo-setting synthetic resin comprises a phenol formaldehyde resin.

15. The cement as defined in claim 8 in which the thermo-setting synthetic resin comprises a urea formaldehyde resin.

16. A composite article comprising structural parts of rigid materials, the surfaces of said rigid materials being secured together by a thin layer of shock-resisting cement, said cement comprising a synthetic thermo-setting resin adhering to surfaces of said parts and containing a synthetic rubber selected from the group consisting of chloroprene polymers and butadiene acrylic nitrile copolymers dispersed as discrete particles in said synthetic resin to distribute the stresses therein.

17. A composite article comprising structural parts of rigid materials, the surfaces of said rigid materials being secured together by a shock-resisting cement, said cement comprising essentially a thermo-setting resin and particles of synthetic rubber selected from the group consisting of a chloroprene polymer and a butadiene acrylic nitrile copolymer, said cement being characterized by presenting a substantially continuous resin surface adhering to the surface of said parts and by the fact that the rubber particles distribute the stresses in said cement to impart shock-resisting qualities thereto.

SEYMOUR G. SAUNDERS.
HARRY MORRISON.